Oct. 5, 1965 YOSHITOSHI SOHDA 3,209,553

DEFROSTING DEVICE IN A REFRIGERATOR

Filed June 4, 1964 5 Sheets-Sheet 1

YOSHITOSHI SOHDA
INVENTOR.

BY Wenderoth, Lind & Ponack
ATTORNEYS

YOSHITOSHI SOHDA
INVENTOR.
BY Wenderoth, Lind & Ponack
ATTORNEYS

Oct. 5, 1965 YOSHITOSHI SOHDA 3,209,553
DEFROSTING DEVICE IN A REFRIGERATOR
Filed June 4, 1964 5 Sheets-Sheet 3

YOSHITOSHI SOHDA
INVENTOR.
BY Wenderoth, Lind and Ponack
ATTORNEYS

YOSHITOSHI SOHDA
INVENTOR.
BY Wenderoth, Lind and Ponack
ATTORNEYS

YOSHITOSHI SOHDA
INVENTOR.

BY Wenderoth, Lind & Ponack
ATTORNEYS 3,209,553

DEFROSTING DEVICE IN A REFRIGERATOR

Yoshitoshi Sohda, 53 Konno-cho, Shibuya-ku, Tokyo, Japan

Filed June 4, 1964, Ser. No. 372,574
Claims priority, application Japan, June 5, 1963, 38/28,602
4 Claims. (Cl. 62—283)

This invention relates to a defrosting device for a refrigerator.

Refrigerators are generally designed in such manner that the freezer (or evaporator) provided for freezing the air in a refrigerator is maintained at a temperature (approximately at minus 15° C.) lower than that of the surrounding air. As a result, the moisture contained in cold air in the refrigerator is condensed on the surface thereof. With the passage of time, condensed water freezes and the ice thus formed grows thicker on the surface of the freezer, giving rise to the so-called frosting. Ice has a thermal conductivity of about 1/168 of that of ordinary commercial copper (generally used for the freezer). Therefore, as the frosting begins to take place, the thermal conduction is rapidly reduced making it difficult to maintain the temperature in the refrigerator at the desired level. To prevent this, frost-removing or defrosting, as it is generally called, is conventionally practiced for removing the frost manually or automatically.

As a means to remove the frost in a refrigerator, there is employed, without exception, the method in which the temperature within the refrigerator is raised to melt the ice and it is then taken out of the refrigerator. However, raising the temperature within the refrigerator, even if temporarily, is not desirable in that it is against the object of a refrigerator.

The present invention has as an object to prevent the condensation of moisture on the surface of the evaporator and maintain the temperature in the refrigerator at a desired low temperature, thus achieving the object of a refrigerator.

The present invention will be better understood from the following description taken in connection with the accompanying drawings in which.

Figure 1:
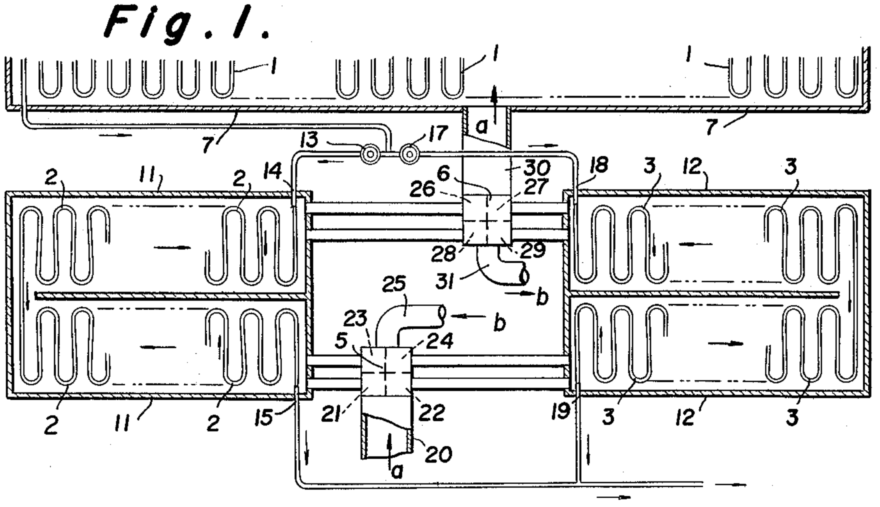
FIG. 1 is a cross-sectional view illustrating a device embodying the invention for preventing the frosting in which there are two precooler compartments.
Figure 3:
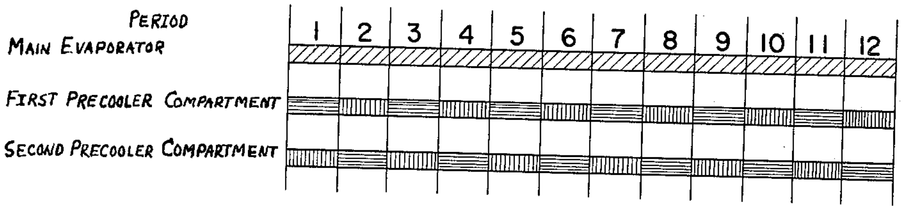

FIG. 3 schematically illustrates the operating sequence of a main evaporator, a first precooler and a second precooler, respectively, mounted in the two-precooler compartment unit shown in FIG. 1.

Figure 2:
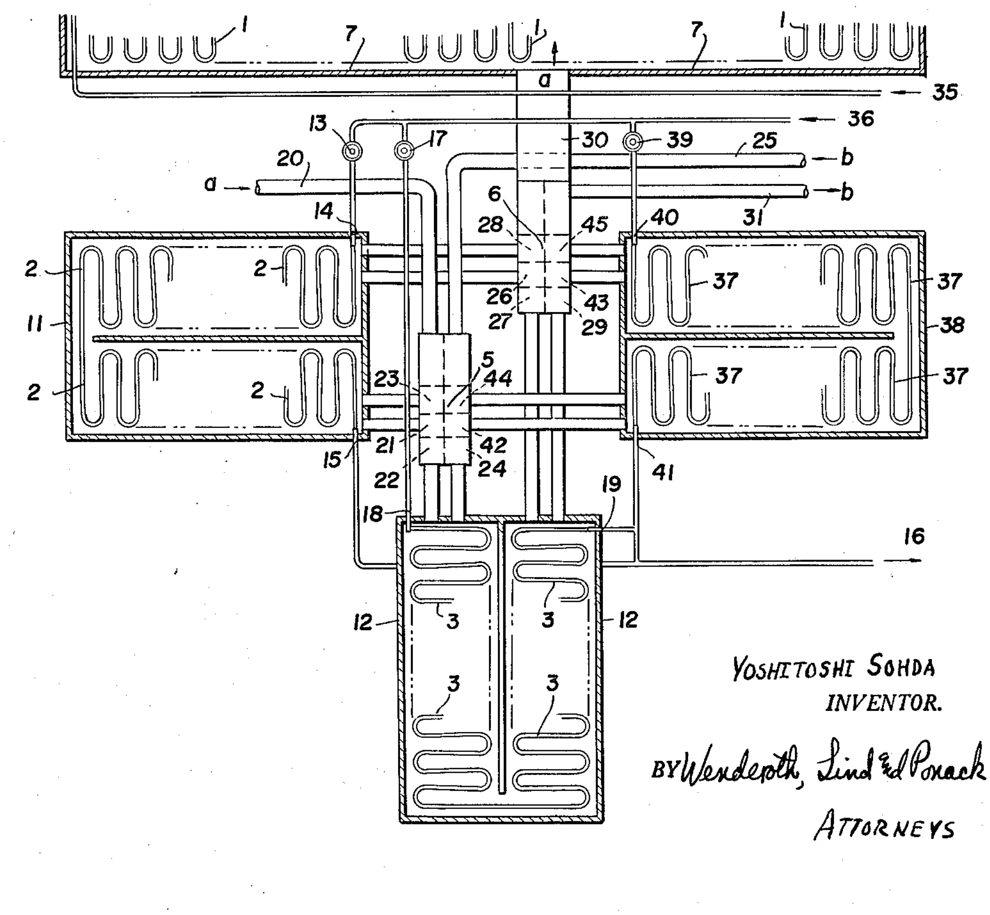
FIG. 2 is a cross-sectional view of another embodiment of the invention having three precooler compartments.
Figure 4:
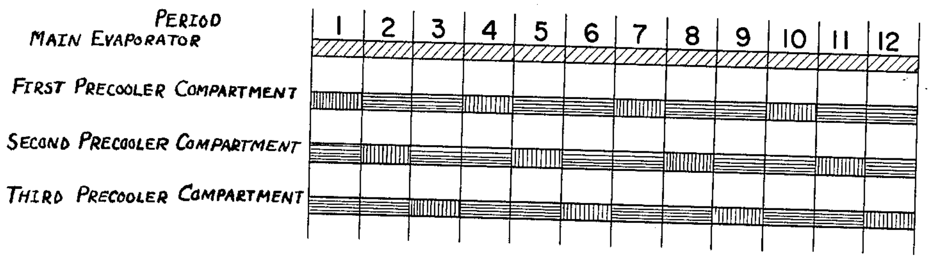

FIG. 4 schematically illustrates the operative conditions shown in Table 3 in the sequence of the main evaporator and precoolers of the three-precooling compartment type unit shown in FIG. 2.

Figure 5:
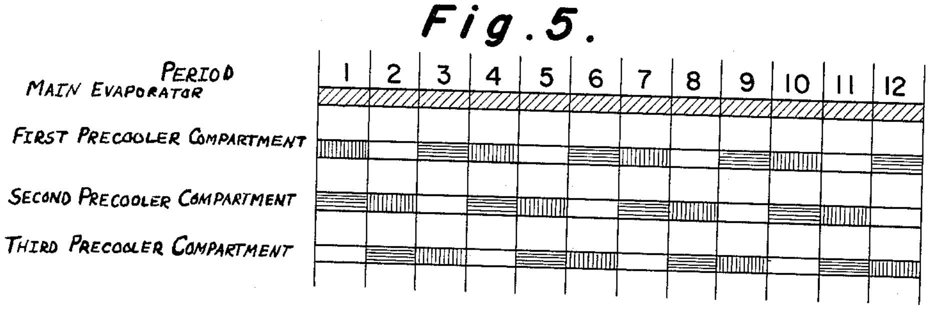
Figure 5:
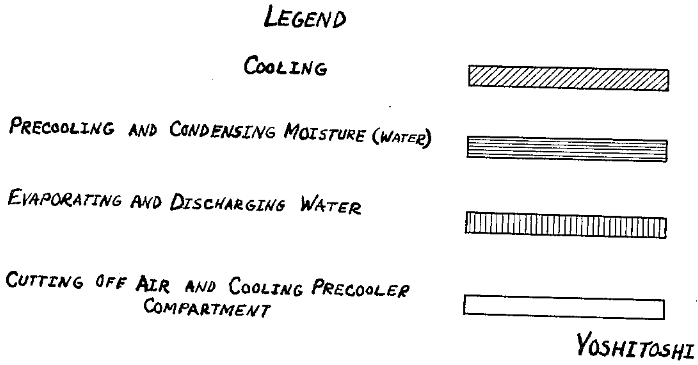

FIG. 5 schematically illustrates the operative conditions shown in Table 4 in the sequence of the main and precoolers in the three-precooler compartment type unit shown in FIG. 2.

Figure 6:
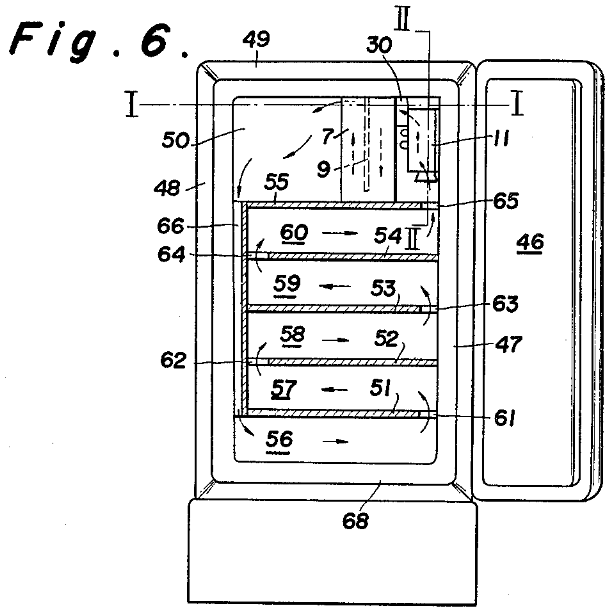

FIG. 6 is a partly cross-sectional front view of a refrigerator of the cold air forced circulation type having a two precooler compartment type unit with the door opened to show its interior.

Figure 7:
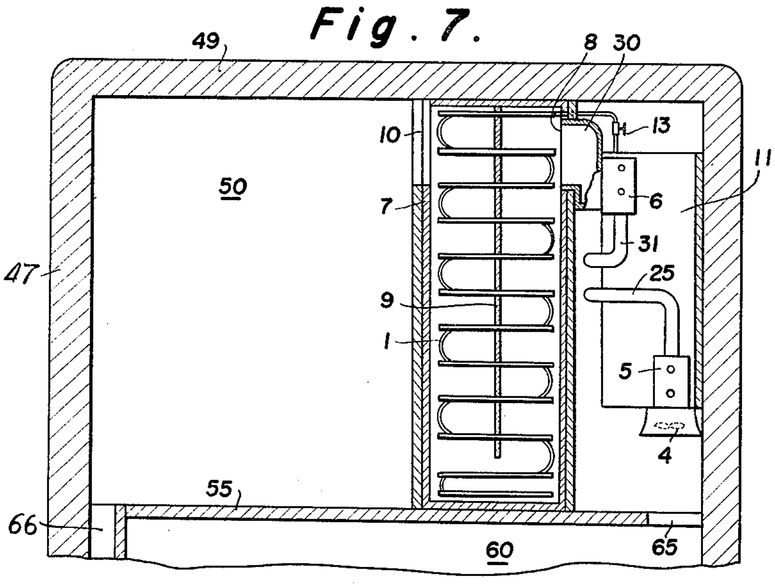
Figure 9:
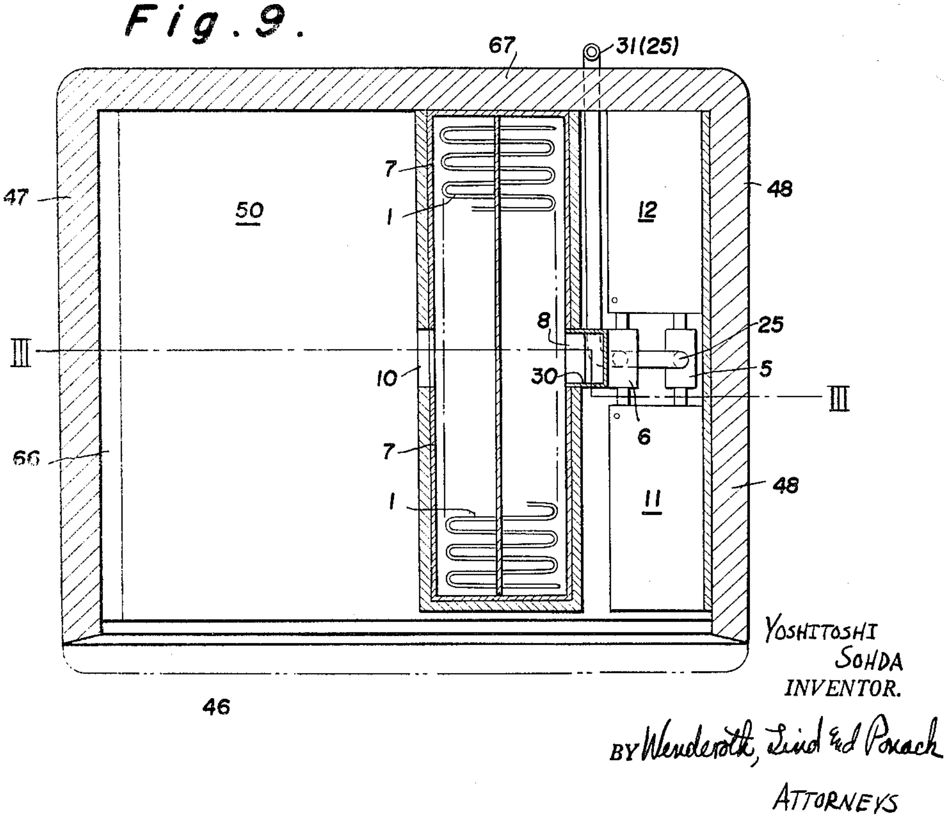

FIG. 7 is a partly cut away cross-sectional front view taken on the line III—III of FIG. 9.

Figure 8:
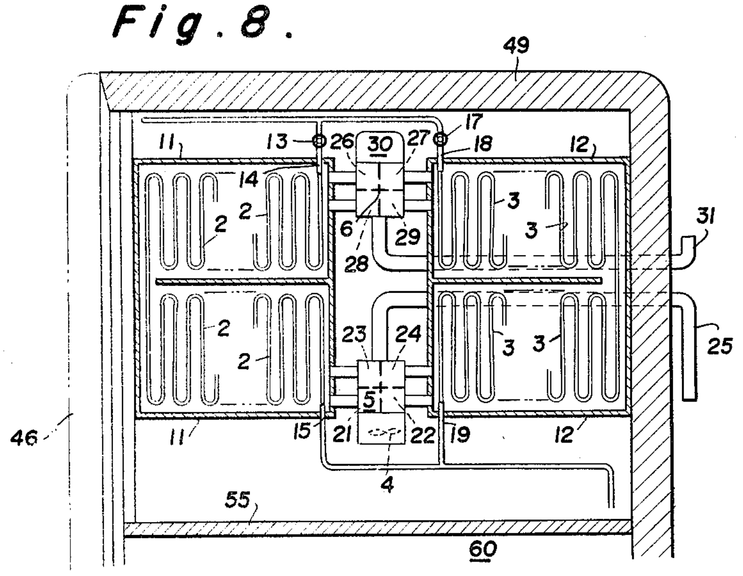

FIG. 8 is a partly cut away cross-sectional side view taken on the line II—II of FIG. 6 and seen from the right hand side.

FIG. 9 is a cross-sectional view taken on the line I—I of FIG. 6.

Figure 10:
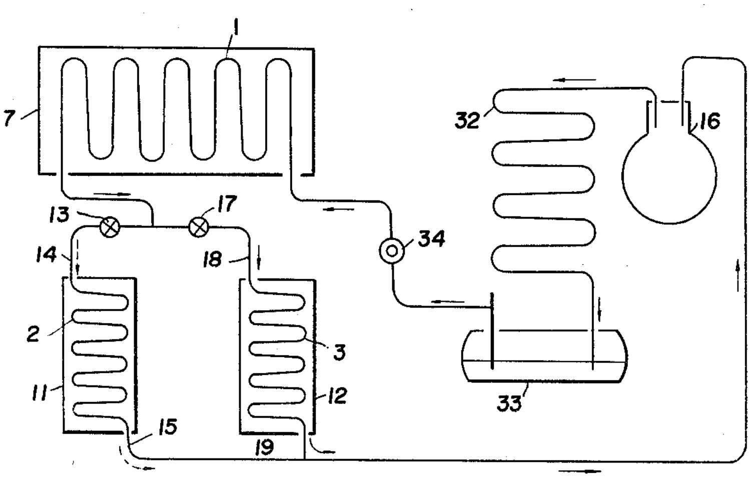
Figure 11:
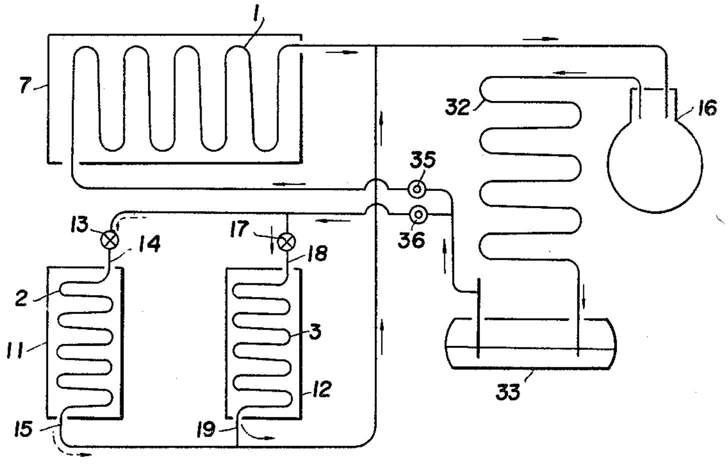

FIG. 10 is a diagram showing the flow path of a refrigerant in the two-precooler compartment type unit shown in FIG. 1, and FIG. 11 is a diagram showing the flow path of a refrigerant with two expansion valves provided in the two-precooler compartment type unit.

The principal features of the invention may be summarized as follows:

(1) The evaporator is enclosed by walls to define a chamber with openings for the inlet and outlet of air provided where desired. The inlet has a fan to circulate cold air from the refrigerator through the chamber and discharge it through the outlet.

(2) The evaporator is divided into two portions, one being larger than the other. The larger portion is used as a main evaporator chamber. The other smaller portion is positioned ahead of the main evaporator with respect to the circulating air stream (up-stream side), and is further divided into a first pre-cooler compartment and a second pre-cooler compartment.

(3) During the first period of air cooling, the circulating cold air containing moisture is forced by the fan into the first pre-cooler compartment where the moisture is condensed on the surface of the pre-cooler which is supercooled and the air becomes dry. The resulting dry air enters the main evaporator chamber. After some time, the second period follows.

(4) In the second period, the flow of circulating cold air is shifted to the second pre-cooler chamber where the moisture of the cold air is collected and the cold air itself is dried and enters the main chamber 7. During the second period, the flow of refrigerant into the pre-cooler in the first precooler compartment is suspended. Instead, external warm air is introduced into the first precooler compartment to evaporate the water (derived from the circulating cold air during the first period) condensed on the surface of the precooler. The warm air introduced gathers the moisture and is discharged out of the refrigerator, thus drying the surface of the precooler.

(5) In the third period, the condition is similar to that of the first period. In the first precooler compartment, moisture in the circulating cold air is collected, and in the second precooler compartment, the warm air introduced from the outside of the refrigerator evaporates the water on the surface of the precooler and carries it out of the refrigerator.

(6) By shifting the foregoing processes automatically and repeating the cycle of such operation, the moisture contained in the cold air circulating through the refrigerator is collected before it reaches the main evaporator and there is no condensation of moisture on the main evaporator, to say nothing of the formation of frosts. Thus, the cooling of air in the refrigerator is accomplished without hazards.

While the present invention is briefly described with reference to the two precooler compartment system with two precooler compartments, it may be equally applied to a three-precooler compartment system.

FIG. 6 illustrates a refrigerator of the forced air circulation type with the two-precooler compartment type unit. In FIGS. 1, 6 and 7 are shown a main evaporator 1, first precooler 2, second precooler 3, fan 4, and special valves 5 and 6 adapted to shift the path of the air current.

The main evaporator is set in a chamber 7 which is enclosed by walls. The air enters the chamber 7 from an inlet 8 shown at the right upper portion, proceeds as shown by arrow first downwardly due to a partition 9 and then moves upwardly and leaves the chamber via outlet 10.

The first precooler 2 and the second precooler 3 are arranged side by side ahead of the main evaporator 1 (i.e., up-stream thereof). They are evaporators of smaller capacity than the main evaporator 1. Similar to the main evaportor 1, these precoolers 2 and 3 are mounted in separate compartments 11, 12.

The valves 5 and 6 supply the cold air pumped by the fan 4 through the first precooler compartment 11 for a certain period of time, and through the second precooler compartment 12 in the succeeding period, to the chamber 7 of main evaporator 1.

Referring to FIG. 1, the part shown at the upper portion is the main evaporator chamber 7 which comprises the main evaporator 1 serving principally for the freezing operation. Shown at the left lower side thereof is the first precooler compartment 11, and at the right lower side is the second precooler compartment 12.

In the first precooler compartment 11 is provided the first precooler 2 which is connected to the main evaporator 1. As shown, the refrigerant flows from the main evaporator 1 through a valve 13 and a communicating tube 14 into the first precooler 2, then leaves the compartment by way of tube 15 and returns to a compressor 16 (shown in FIGS. 10 and 11). The second precooler compartment 12 shown at the right lower portion of FIG. 1 has the same construction as the first precooler compartment 11. The refrigerant flows from the main evaporator 1 through a valve 17 and a communicating tube 18 into the second precooler 3 then leaves the compartment by way of a tube 19 and returns to the compressor 16.

The special valve 5 shown at the mid lower portion of FIG. 1 receives the following two kinds of air streams.

a. One is the current of air circulting through the refrigerator which is cooled by the main refrigerator thereby taking up heat from the contents of the refrigerator which are to be cooled. This is called a cold circulating air (a).

b. The other is the current of warm air which is introduced from the exterior, completely isolated from the cold air (a), into the precooler chamber 11 or 12 in which the air (a) is not flowing and then discharged out of the refrigerator. This is called a warm passing air (b).

The circulating cold air (a) enters the valve 5 by way of a conduit 20. As shown in FIG. 1, the valve 5 comprises valve chests 21, 22, 23 and 24. The circulating cold air (a) is introduced in to the first precooler compartment 11 by way of the valve chest 21 of the valve 5, or into the second precooler compartment 12 by way of the valve chest 22.

The passing warm air (b) enters the valve 5 by way of a conduit 25, and is introduced into the first precooler compartment 11 through the valve chest 23 or the second precooler compartment 12 through the valve chest 24.

The special valve 6 shown at the mid upper portion of FIG. 1 comprises valve chests 26, 27, 28 and 29. By the operation of the valve 6, the flow of current is controlled as follows. The circulating cold air (a) coming from the first precooler compartment 11 through the valve chest 26 or that from the second precooler compartment 12 through the valve chest 27 is conveyed to the main evaporator chamber 7 through a conduit 30. The passing warm air (b) coming from the first precooler compartment 11 through the valve chest 28 or that from the second precooler compartment 12 through the valve chest 29 is discharged out of the refrigerator through a conduit 31.

The sequence of opening and closing the respective valve chests of the valves 5 and 6 in the two-precooler compartment type unit shown in FIG. 1 is represented in the following Table 1.

*Table 1*

| Period | Valve 13 | Valve 17 | Valve 5 | | Valve 6 | | Valve 5 | | Valve 6 | | Air flow | |
|---|---|---|---|---|---|---|---|---|---|---|---|---|
| | | | Chest 21 | Chest 23 | Chest 26 | Chest 28 | Chest 22 | Chest 24 | Chest 27 | Chest 29 | First Compartment 11 | Second Compartment 12 |
| First period | O | X | O | X | O | X | X | O | X | O | a | b. |
| Second period | X | O | X | O | X | O | O | X | O | X | b | a. |
| Third period | O | X | O | X | O | X | X | O | X | O | a | b. |

NOTE.—The symbol "O" designates the valve in open position and the symbol "X" for closed position.

In the first period, the valve 13, valve chest 21 of the valve 5 and valve chest 26 of the valve 6, are open so that the refrigerant flows into the first precooler 2. The circulating cold air (a) supplied by the fan 4 into the first precooler compartment 11 has the moisture therein condensed on the surface of the precooler while passing through the compartment. It then becomes dry and flows into the main evaporator chamber 7. Here, being already dry, the air leaves no moisture condensed on the surface of the evaporator 1. On the other hand, the valve 17 is closed so that there is no flow of refrigerant in the second precooler 3. However, the valve chests 24 and 29 are open so that the passing warm air 6 introduced by a fan (not shown) the fan from exterior of the refrigerator by way of a conduit 25 passes through the second precooler compartment 12, evaporating the water which has condensed on the surface of the precooler 3, and is discharged out of the refrigerator by way of a conduit 31, carrying out with it the moisture thus evaporated. As a result, the surface of the second precooler 3 is dried.

In the second period, the respective valves and valve chests are reversed in position, with the result that the first precooler compartment 11 has the flow of passing warm air (b) which after drying the surface of the precooler 2 flows out of the refrigerator. Meanwhile, the second precooler compartment 12 has the flow of circulating cold air (a) which after the moisture contained therein collected on the surface of the precooler 3, becomes dry and is conveyed to the main evaporator chamber 7. In short, the moisture in the air of the refrigerator is collected on the surface of a precooler and is carried by the externally introduced warm air out of the refrigerator in the succeeding period.

In the third period, the operation is exactly the same as that in the first period. Such a cycle of operation will be more clearly understood from FIG. 3.

If this cyclic operation is repeated automatically with each period adjusted, there will be no frost formed on, or even condensation of water caused on, the surface of the main evaporator 1, thus permitting the main evaporator to function as desired.

FIG. 1 illustrates a device in which a portion of the main evaporator (the lowest portion of the flow of refrigerant) is utilized for the first precooler 11 and second precooler 12. FIG. 10 shows the path of flow of refrigerant.

In FIG. 10 are shown a compressor 16, condenser 32, drip-pan 33, expansion valve 34, main evaporator 1, and electromagnetic valves 13 and 17 (other like parts are referred to by the numerals in FIG. 1). The arrow indicates the direction in which the refrigerant flows.

If desired, two expansion valves 35 and 36 may be provided as shown in FIG. 11, one expansion valve 35 being exclusively used for main evaporator 1 and the other expansion valve 36 being used for two precoolers 2 and 3.

The foregoing construction may be used for a different mode of operation by changing the position of each valve as shown in the following Table 2.

*Table 2*

| Period | Valve 13 | Valve 17 | Valve 5 | | Valve 6 | | Valve 5 | | Valve 6 | | Air flow | | Remarks |
|---|---|---|---|---|---|---|---|---|---|---|---|---|---|
| | | | Chest 21 | Chest 23 | Chest 26 | Chest 28 | Chest 22 | Chest 24 | Chest 27 | Chest 29 | First Compartment 11 | Second Compartment 12 | |
| First Period | O | X | O | X | O | X | X | O | X | O | a | b | |
| Second Period | O | O | O | X | O | X | X | X | X | X | a | None | Short duration. |
| Third Period | X | O | X | O | X | O | O | X | O | X | b | a | |
| Fourth Period | O | O | X | X | X | X | O | X | O | X | None | a | Do. |
| Fifth Period | O | X | O | X | O | X | X | O | X | O | a | b | |

NOTE.—In the table, the symbol "O" designates the valve in open position and the symbol "X" for closed position of the valve. "None" indicates the absence of flow of air.

In the first period (see FIG. 1), the valve 13, valve chests 21 and 26 are open so that the refrigerant flows in the first precooler 2. The circulating cold air (a) supplied by the fan 4 into the first precooler compartment 11 has its moisture condensed on the surface of the precooler 2 while passing through the compartment, thus being dried and flows into the main evaporator chamber 7. On the other hand, the valve 17 is closed so that there is no flow of refrigerant in the second precooler 3. Since the valve chests 24 and 29 are open, the passing warm air introduced from outside the refrigerant through the conduit 25 by means of a fan (not illustrated) evaporates, during its passage through the second precooler compartment 12, the water condensed on the surface of the precooler 3, and carries the moisture thus evaporated out of the refrigerator through the conduit 31. As a result, the surface of the second precooler 3 is allowed to dry.

In the second period, the valve 17 is opened and the valve chests 24 and 29 are closed. (A switch (not illustrated) controlling the fan for supplying the passing warm air (b) is turned to the "off" position.) The first precooler compartment 11 is kept in the same condition as in the first period except that the flow of refrigerant in the first precooler 2 is reduced. On the other hand, there is a flow of refrigerant in the second precooler 3 but no flow of air in the second precooler compartment 12 so that the second precooler is rapidly cooled. (During the first period, the second precooler 3 has an elevated temperature and warm air has been used to evaporate the water on the surface thereof. However, due to the latent heat of vaporization the precooler is held usually at a temperature lower than that of passing warm air (b).) Therefore, the second period may be relatively short.

The third period is substantially the same as the second period in the case of Table 1 operation.

The fourth period is the reverse of the second period. In the second precooler compartment 12 there is a flow of circulating cold air (a) and in the first precooler 2 there is a flow of refrigerant. But, there is no passage of air through the first precooler compartment 11 so that the first precooler 2, the temperature of which has been raised during the third period, is now cooled rapidly. The fourth period may be relatively short.

The fifth period is the same as the first period. During this fifth period the operating conditions are the same as in the first period.

Table 1 illustrates the example in which the circulation cold air (a) and the passing warm air (b) are alternately passed through the first and second precooler compartments 11 and 12. Table 2 shows the example in which the passage of warm air (b) is stopped for a short time during the switching of the two sets of air flows while refrigerant flows through the precoolers 2 and 3, so that the precoolers are sufficiently cooled before the air current is shifted from (a) and (b).

Now a three-precooler compartment system will be described with reference to FIG. 2.

Shown at the upper portion of FIG. 2 is a main evaporator chamber 7 comprising a main evaporator 1. Shown at the lower portion is a second precooler compartment 12 having therein a second precooler 3. Shown at the left is a first precooler compartment 11 having a first precooler 2 and shown at the right is a third precooler compartment 38 having a third precooler 37.

Shown at the central portion of FIG. 2 on the right upper side is a special valve 6 and on the left lower side is also a special valve 5.

In FIG. 2, parts the same as parts in FIG. 1 are referred to by like numerals.

The operative conditions of the three-precooler compartment type unit shown in FIG. 2 will be described.

The refrigant coming from a first expansion valve 35 (FIG. 11) flows through the main evaporator 1, and that from a second expansion valve 36 flows, as shown by arrow at the right upper portion of FIG. 2, through the valve 13 and communicating tube 14 into the first precooler 2, then through tube 15 and out of the compartment and back to the compressor 16.

Similarly, with respect to the second precooler 3, the refrigerant flows through the valve 17 and communicating tube 18 to the second precooler 3, then through tube 19 and out of the compartment and back to the compressor 16.

With respect to the third precooler 37, the refrigerant flows through the valve 39 and tube 40 to the third precooler 37, then through tube 41 and out of the compartment and back to the compressor 16.

The circulating cold air (a) supplied by the fan 4 flows from the conduit 20 in FIG. 2 through the valve chest 21 of valve 5 into the first precooler compartment 11 then through the valve chest 26 of valve 6 and the conduit 30 into the main evaporator chamber 7. Similarly, with respect to the second precooler 3, the refrigerant flows through the valve chest 22 of valve 5 in FIG. 2 into the second precooler compartment 12 and further through the valve chest 27 of valve 6 and the conduit 30 into the main evaporator chamber 7.

With respect to the third precooler 37, the refrigerant flows through the valve chest 42 of valve 5 in FIG. 2 into the third precooler compartment 38 and further through the valve chest 43 of valve 6 and the conduit 30 into the main evaporator compartment 7.

The passing warm air (b) introduced from outside of the refrigerator flows from the conduit 25 through the valve chest 23 of the special valve 5 into the first precooler compartment 11 and further through the valve chest 28 of the special valve 6 and out of the refrigerator by way of the conduit 31.

Similarly, with respect to the second precooler 3, the air (b) flows through the valve chest 24 of the special valve 5 into the second precooler compartment 12 and further through the valve chest 29 of the special valve 6 and out of the refrigerator by way of the conduit 31.

With respect to the third precooler 37, the air (b) enters through the valve chest 44 of the special valve 5 into the third precooler compartment 38 and further through the valve chest 45 of the special valve 6 and out of the refrigerator by way of the conduit 31.

The sequence of opening and closing the valve chests in the three-precooling compartment type device shown in FIG. 2 and the mode of operation are illustrated in Table 3.

*Table 3*

| Period | Valve 13 | Valve 17 | Valve 39 | Valve 5 Chest 21 | Valve 5 Chest 23 | Valve 6 Chest 26 | Valve 6 Chest 28 | Valve 5 Chest 22 | Valve 5 Chest 24 |
|---|---|---|---|---|---|---|---|---|---|
| First period | X | O | O | X | O | X | O | O | X |
| Second period | O | X | O | O | X | O | X | X | O |
| Third period | O | O | X | O | X | O | X | O | X |
| Fourth period | X | O | O | X | O | X | O | O | X |

| Period | Valve 6 Chest 27 | Valve 6 Chest 29 | Valve 5 Chest 42 | Valve 5 Chest 44 | Valve 6 Chest 43 | Valve 6 Chest 45 | Air flow First Compartment 11 | Air flow Second Compartment 12 | Air flow Third Compartment 38 |
|---|---|---|---|---|---|---|---|---|---|
| First period | O | X | O | X | O | X | b | a | a. |
| Second period | X | O | O | X | O | X | a | b | a. |
| Third period | O | X | X | O | X | O | a | a | b. |
| Fourth period | O | X | O | X | O | X | b | a | a. |

NOTE.—The symbol "O" represents the valves in open position and the symbol "X" for closed position of the valves.

The mode of operation shown in Table 3 indicates as seen from FIG. 4 where one period is dealt with, that in one precooler the flow of refrigerant is suspended while in its compartment is flowing the passing warm air (b) to evaporate the water condensed on the surface of the precooler during the previous period. During such a period, the refrigerant is flowing through the other two precoolers, and the circulating cold air (a) is passing through their compartments so that the moisture therein condenses on the surfaces of the respective precoolers. Such operative condition takes place alternately.

A different mode of operation is also possible in a three-precooler compartment type device similar to that of FIG. 2 by changing the position of each valve. An example is given in Table 4.

*Table 4*

| Period | Valve 13 | Valve 17 | Valve 39 | Valve 5 Chest 21 | Valve 5 Chest 23 | Valve 6 Chest 26 | Valve 6 Chest 28 | Valve 5 Chest 22 | Valve 5 Chest 24 |
|---|---|---|---|---|---|---|---|---|---|
| First period | X | O | O | X | O | X | O | O | X |
| Second period | O | X | O | X | X | X | X | X | O |
| Third period | O | O | X | O | X | O | X | X | X |
| Fourth period | X | O | O | X | O | X | O | O | X |

| Period | Valve 6 Chest 27 | Valve 6 Chest 29 | Valve 5 Chest 42 | Valve 5 Chest 44 | Valve 6 Chest 43 | Valve 6 Chest 45 | Air flow First Compartment 11 | Air flow Second Compartment 12 | Air flow Third Compartment 38 |
|---|---|---|---|---|---|---|---|---|---|
| First period | O | X | X | X | X | X | a | b | None. |
| Second period | X | O | O | X | O | X | None | b | a. |
| Third period | X | X | X | O | X | O | a | None | b. |
| Fourth period | O | X | X | X | X | X | b | a | None. |

NOTE.—The symbol "O" indicates the valve in open position and the symbol "X" for closed position of the valve. "None" indicates no flow of air.

The operative condition of each valve represented by Table 4 is also illustrated schematically in FIG. 5. The operative condition with respect to each of the three precoolers in one period is as follows.

With respect to the first precooler 2, the refrigerant therein ceases to flow, and the passing warm air (b) introduced externally evaporates the water (condensed during the preceding period) on the surface of the precooler 2.

With respect to the second precooler 3, the refrigerant is flowing therein and the circulating cold air (a) in the refrigerator passes through the second precooler compartment 12. The moisture contained in the cold air (a) is condensed on the surface of the precooler 3.

With respect to the third precooler, the passing warm air (b) which has been flowing therethrough is stopped, resulting in no flow of air. However, the refrigerant begins to flow in the third precooler 37 so that the temperature of the precooler 37 is reduced rapidly for that period.

The conditions of one specific cooler with respect to the consecutive three periods are as follows:

*First period.*—In the precooler there is a flow of refrigerant, but there is no passage of air in the precooler compartment so that the precooler, the temperature of which has been raised by the passing warm air (b) during the preceding period, is rapidly cooled.

*Second period.*—The refrigerant continues to flow in the precooler and the circulating cold air (a) passes through the precooler compartment so that the moisture contained in the cold air (a) is captured by the precooler at a low temperature and condenses on the surface thereof and the cold air (a) is dried and conveyed to the main evaporator chamber 7.

*Third period.*—The flow of refrigerant in the precooler is suspended and the external warm air (b) passes through the precooler compartment. As a result, the water condensed on the surface of the precooler is evaporated, and the vapor is collected by the passing warm air (b) and is carried out of the refrigerator.

The foregoing operation is repeated in cycles.

Now, a refrigerator of the forced cold air circulation type embodying the invention having the two-precooler compartment type device will be described with reference to FIGS. 6, 7, 8 and 9.

As in ordinary refrigerators, the main evaporator 1 is provided at the uppermost position and is enclosed by walls having the inlet and outlet openings so as to form a chamber. This chamber constitutes a main evaporator chamber 7.

Provided ahead of the main evaporator chamber 7 (with respect to the path of circulating air flow in the refrigerator) are a first precooler 2 and a second precooler 3 that are parallel to each other. These are also enclosed by walls to form their respective compartments. These compartments constitute a first precooler compartment 11 and a second precooler compartment 12.

The refrigerant from the compresser and expansion valve (these are not illustrated) of the refrigerator enters the main evaporator 1, a part of which is divided into two sections (see FIG. 8), one forming a first precooler in which refrigerant flow is controlled by an electromagnetic valve 13 and the other forming a second precooler in which refrigerant flow is controlled by an electromagnetic valve 17, both precoolers being connected at the downstream end to the compressor 16.

Between the main evaporator chamber 7 and the first and second precooler compartments 11 and 12, a special valve 6 is provided. A similar special valve 5 is also provided between a fan 4 provided for introducing the circulating cold air within the refrigerator (see FIGS. 7 and 8) and the first and second precooler compartments 11 and 12.

The warm air (b) around the compresser (not illustrated) of the refrigerator is blown by a small fan (not shown) into the special valve 5 by way of a conduit 25 (shown at the right side in FIG. 8). The warm air flows from the special valve 5 through either the first or second precooler compartment 11 or 12 and is discharged through the special valve 6 and out of the refrigerator from a conduit 31 (shown at the right side in FIGS. 7 and 8).

The cold air within the refrigerator is blown by the fan 4 into either the first precooler compartment 11 or the second precooler compartment 12 depending upon the open or closed position of the special valve 5. It then enters the main evaporator chamber 7 through the special valve 6 and conduit 30, where it is cooled by the main evaporator 1 and flows out of the outlet above the chamber and into the uppermost compartment 50.

The circulating cold air (a) within the refrigerator has its moisture captured by the precoolers 2 and 3, and is sent in a dry state to the main evaporator chamber 7 so that no condensation and formation of frost takes place on the surface of the main evaporator 1. During such a period, the passing warm air (b) is introduced into the other precooler compartment from outside the refrigerator to evaporate water residue on the surface of the precooler and carry it out of the refrigerator.

As described above, the refrigerator shown in FIGS. 6 through 9 is of the cold air forced circulation type adapted for the two-precooler compartment type device according to the invention. The construction thereof is briefly described. Referring to FIGS. 6 through 9, each of the shelves 51, 52, 53 and 54 provided horizontally in the refrigerator is a plate made from materials having no gas permeability such as, for example, metals or plastics. The compartments 56, 57, 58, 59 and 60 formed by these shelves and the uppermost compartment 50 are respectively connected with adjoining compartments only by paths for air provided in every other shelf on one side of the refrigerator and in the alternate shelves on the other. The uppermost compartment 50 and the lowest compartment 56 are so arranged as to be connected directly by a conduit 66 running along a side wall 48 of the refrigerator. Designated at 67 is a rear wall and at 68 is the bottom of the refrigerator. Having thus described the construction and operation of an embodiment of the invention, the advantages inherent in this device may be listed below:

(1) The conventional defrosting operation, irrespective of whether it is operated manually or automatically, is normally performed once every day or every few days. Between such defrosting operations, the frost tends to accumulate. The thermal conductivity of ice is about $\frac{1}{168}$ of that of commercial copper so that the efficiency of the evaporator is rapidly reduced.

On the other hand, in the device according to the present invention, the air is dried due to its moisture being collected by the precoolers, before it is passed over the main evaporator so that no frost or even condensed water is formed on the surface of the evaporator. Thus, the evaporator is maintained fully effective at all times.

(2) As mentioned above, the capacity of the evaporator in the ordinary refrigerator declines gradually so that it is difficult to maintain the temperature in the refrigerator as desired and therefore to preserve the contents free from deterioration.

However, in the device according to the present invention, the evaporator always operates at its full capacity so that it is possible to maintain the temperature within the refrigerator as desired, permitting safe preservation of the foods therein.

(3) In the conventional apparatus, the surface of the evaporator is covered with a coating of a poor heat conductivity so that the efficiency of the refrigerator is rapidly reduced, resulting in an increase in the cost for power.

In the device of the present invention, the refrigerator operates satisfactorily with the advantage of reduced power consumption.

(4) In the conventional apparatus, the defrosting operation, whether it is manual or automatic, causes an increase in the temperature of the refrigerator. Such temperature increases are objectionable in view of the purposes of refrigeration, causing a deterioration of the materials to be preserved.

In the device of the present invention, the moisture which is the cause of frost formation is collected and carried out of the refrigerator so that the air in the refrigerator can be maintained at a desired low temperature.

(5) The recent trend in food preservation is toward prolonged storage in a refrigerator. This makes the conventional system of refrigeration so much more inappropriate. However, with the device of the present invention, it is possible to maintain the system at a desired low temperature for a long time.

Having thus described the construction and operation of an embodiment of the invention, it will be understood that various substitutions, changes and modifications may be made without departing from the scope of the following claims.

What is claimed is:

1. A defrosting means for a refrigerator having a main evaporator chamber with a main evaporator therein and a refrigeration system, said defrosting means comprising a plurality of precooler chambers adjacent said main evaporator chamber, each having a relatively small precooler evaporator therein, said precooler evaporators being adapted to be connected to the refrigeration system of the refrigerator, refrigerant control valves in said precooler evaporators, a first fan within the refrigerator, cold air conduits extending from said fan and opening into each of said precooler chambers, cold air conduits opening out of and extending from each of said precooler chambers and adapted to open into said main evaporator chamber, warm air conduits extending from outside the refrigerator and opening into each of said precooler chambers and warm air conduits opening out of and extending from each of said precooler chambers and opening outside the refrigerator, a second fan coupled in said warm air conduits, and air valves in said air conduits for controlling the flow of air in said air conduits, whereby the air control valves can be set to divert air from the first fan through a first precooler and into the main evaporator chamber and the refrigerant valves set to cause refrigerant to flow only through the evaporator in the first precooler chamber, so that air from the refrigerator is cooled and water condensed out of it onto the precooler evaporator in the first precooler chamber, and warm air from outside the refrigerator can be blown by the second fan through at least one of the other precooler chambers for evaporating the condensed water on the precooler evaporator in said other precooler chamber while the flow of refrigerant through the precooler evaporator is blocked and carrying the thus evaporated water out of the other precooler chamber into the space outside of the refrigerator.

2. A defrosting means as claimed in claim 1 in which said precooler evaporators are adapted to be connected to the downstream end of the main evaporator, and to the compressor in the refrigeration system.

3. A defrosting means as claimed in claim 1 in which there are two precooler chambers and two precooler evaporators, whereby one precooler evaporator can be used to condense water from the air in the refrigerator while the other precooler evaporator is being defrosted by the warm air from outside the refrigerator.

4. A defrosting means as claimed in claim 1 in which there are three precooler chambers and three precooler evaporators, whereby one precooler evaporator can be used to condense water from the air in the refrigerator while a second is being defrosted by the warm air from outside the refrigerator and the third is being precooled by causing refrigerant to flow through it while the flow of warm air from outside the refrigerator and the flow of cold air from within the refrigerator are both blocked off from the third precooler chamber.

References Cited by the Examiner

UNITED STATES PATENTS

| | | | |
|---|---|---|---|
| 511,217 | 12/93 | Schneider | 62—272 |
| 1,003,129 | 9/11 | Wittenmeier | 62—272 |
| 2,254,420 | 9/41 | Cleveland | 62—283 |
| 2,481,348 | 9/49 | Ringquist | 62—151 |
| 2,621,899 | 12/52 | Larson | 62—275 |
| 3,063,256 | 11/62 | Lamb | 62—283 |

WILLIAM J. WYE, *Primary Examiner.*